O. B. AUSTIN.
Horse Hay-Rakes.
No. 134,239.                                Patented Dec. 24, 1872.
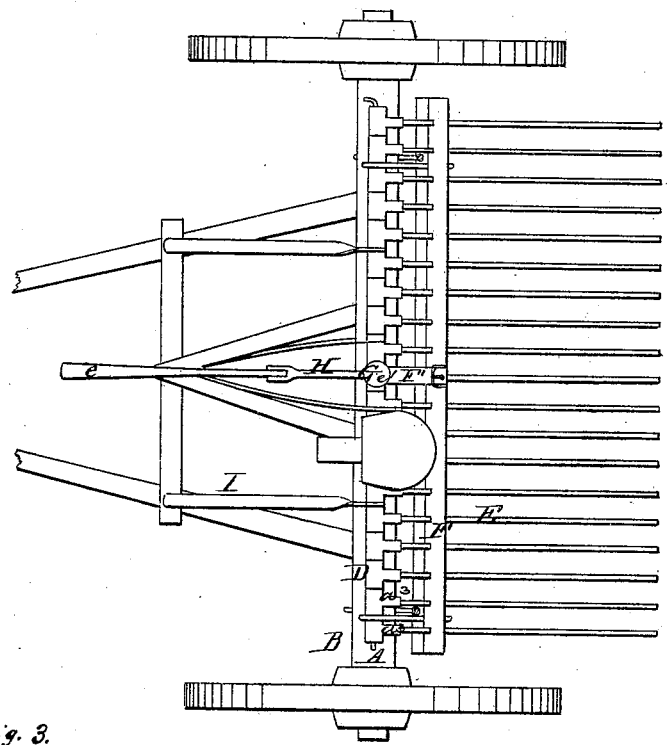
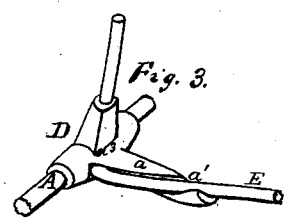
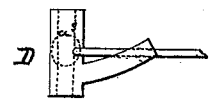
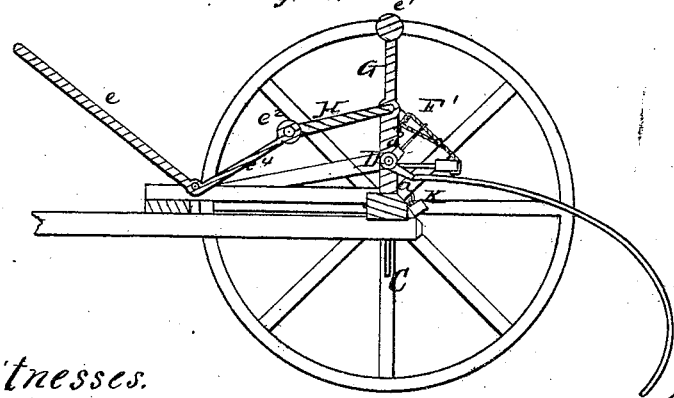
Witnesses.
Inventor.
Oel B. Austin,
Chipman Hosmer & Co.
Attorneys

UNITED STATES PATENT OFFICE.

OEL B. AUSTIN, OF POTSDAM JUNCTION, NEW YORK.

IMPROVEMENT IN HORSE HAY-RAKES.

Specification forming part of Letters Patent No. 134,289, dated December 24, 1872.

*To all whom it may concern:*

Be it known that I, OEL B. AUSTIN, of Potsdam Junction, in the county of St. Lawrence and State of New York, have invented a new and valuable Improvement in Horse Hay-Rakes; and I do hereby declare that the following is a full, clear, and exact description of the construction and operation of the same, reference being had to the annexed drawing making a part of this specification, and to the letters and figures of reference marked thereon.

Figure 1 of the drawing is a representation of a top view of my invention; Fig. 2 is a vertical longitudinal section of same; and Figs. 3 and 4 are detail views of same.

This invention has relation to horse hay-rakes; and it consists in the construction and novel arrangement of the thimbles which hold the teeth and the mode of securing the teeth thereto; the devices for raising and lowering the teeth to adapt them to different surfaces; the dumping apparatus; and the gage-bar for keeping the teeth in proper relation, all substantially as hereinafter described.

Referring to the drawing, A designates a horizontal rod, supported above the axle B by adjustable standards C, passing through slots in the latter. D are T-shaped thimbles, arranged independently upon the rod A and holding the teeth E, which, by reason of said arrangement, are permitted to move separately in order to adapt themselves to irregular surfaces. The thimbles are of peculiar construction, being provided with the rearwardly-projecting shanks $a$, having oblique grooves $a^1$, and with openings $a^2$ communicating with the sockets $a^3$. The object of this form of thimble is to allow broken or injured teeth to be readily replaced without the necessity of removing the thimble. An arm is bent on the upper end of the tooth and passed up through the socket $a^3$, forward of the rod. The tooth is then carried under the latter and sprung into the groove of the shank $a$, as shown, where it remains rigidly. F represents a bar, located behind the upper ends of the teeth and hinged to the rod A by means of eye-rods. This bar is for the purpose of dumping the load, and is connected by means of a strap, F', to a weighted lever, G, pivoted to the rod A, and connected by means of a link, H, to an L-shaped lever, $e$, which is pivoted to the frame of the implement near the front thereof.

When the lever $e$ is drawn back the weight $e^1$ falls forward of the joint $e^2$, which, at the same time, sinks, and thus the teeth are raised and held in position. When the lever $e$ is thrown forward the link H and arm $e^4$ of said lever assume a position on a line with each other, and thus constitute a brace to prevent the weighted lever from falling forward.

The rake may be adapted to work on any surface by simply removing the keys from the standards C and letting the rod A down to its lowest position.

Spring-arms I, connecting the rod A to the forward part of the frame, give the requisite degree of support to the bar A at points between the standards C.

When desired to rake a smooth surface the teeth are raised by moving the standards C upward and placing the keys in the lowest holes. The teeth now glide over the ground without picking up dirt or stones or scratching the ground.

The adjustable bar K, which passes under the teeth and is attached to hooks passing through the axle, serves as a gage in every position to which the teeth are adjusted, preventing them from swinging under the axle. This bar is especially useful when it is desired to not let the teeth fall below the wheels.

The strap F' must be lengthened or shortened, according to the position to which the teeth are adjusted.

What I claim as my invention, and desire to secure by Letters Patent, is—

1. The thimbles D having the shanks $a$ with oblique grooves $a^1$ communicating with openings $a^2$ in the sockets $a^3$, substantially as specified.

2. The weighted lever G, link H, and L-shaped lever $e$, in combination with the flexible connection F', bar F, and teeth E, substantially as specified.

3. The adjustable connection F', in combination with the adjustable teeth E, bar F, and weighted lever G, substantially as specified.

4. The combination of the rod A, thimble D, adjustable standard C, teeth E, arms I, and adjustable gage-bar K, substantially as specified.

In testimony that I claim the above I have hereunto subscribed my name in the presence of two witnesses.

OEL B. AUSTIN.

Witnesses:
LOREN R. ASHLEY,
JOHN J. RUTHERFORD.